(12) United States Patent
Narsky et al.

(10) Patent No.: US 11,410,073 B1
(45) Date of Patent: Aug. 9, 2022

(54) SYSTEMS AND METHODS FOR ROBUST FEATURE SELECTION

(71) Applicant: The MathWorks, Inc., Natick, MA (US)

(72) Inventors: Ilya V. Narsky, Newton, MA (US);
Gautam V. Pendse, Hopkinton, MA (US)

(73) Assignee: The MathWorks, Inc., Natick, MA (US)

( * ) Notice: Subject to any disclaimer, the term of this patent is extended or adjusted under 35 U.S.C. 154(b) by 1144 days.

(21) Appl. No.: 15/610,073

(22) Filed: May 31, 2017

(51) Int. Cl.
*G06N 20/00* (2019.01)

(52) U.S. Cl.
CPC .................. *G06N 20/00* (2019.01)

(58) Field of Classification Search
CPC ...................................... G06N 20/00
See application file for complete search history.

(56) References Cited

U.S. PATENT DOCUMENTS

| | | | | |
|---|---|---|---|---|
| 10,339,468 | B1* | 7/2019 | Johnston | G06N 5/04 |
| 2009/0055139 | A1* | 2/2009 | Agarwal | G06Q 10/04 |
| | | | | 703/2 |
| 2012/0191632 | A1* | 7/2012 | Chen | G06F 16/35 |
| | | | | 706/12 |
| 2014/0222724 | A1* | 8/2014 | Gao | G06N 20/00 |
| | | | | 706/12 |
| 2016/0048766 | A1* | 2/2016 | McMahon | G06Q 10/04 |
| | | | | 706/12 |
| 2017/0243051 | A1* | 8/2017 | Chukka | G06K 9/6292 |
| 2018/0107925 | A1* | 4/2018 | Choi | G06N 3/084 |
| 2018/0137219 | A1* | 5/2018 | Goldfarb | G06F 30/20 |
| 2019/0294923 | A1* | 9/2019 | Riley | G06T 7/001 |

OTHER PUBLICATIONS

Nie et al., "Adaptive loss minimization for semi-supervised elastic embedding", Proc. IJCAI, 2013. (Year: 2013).*
Nie et al., Efficient and robust feature selection via joint L2,1 norms minimization, NIPS, 2010. (Year: 2010).*
M. Schmidt et al., "Optimization Methods for L1-Regularization", Univ. British Columbia, Vancouver, BC, Canada, Tech. Rep. TR-2009-19, 2009 (Year: 2009).*
Yang et al., "An efficient primal dual prox method for non-smooth optimization", Springer, 2014. (Year: 2014).*

(Continued)

*Primary Examiner* — Alexey Shmatov
*Assistant Examiner* — Beatriz Ramirez Bravo
(74) *Attorney, Agent, or Firm* — Wolf, Greenfield & Sacks, P.C.

(57) ABSTRACT

A device may generate an objective function for determining weights for potential features corresponding to training data. The objective function may be generated using a robust loss function such that the objective function is at least continuously twice differentiable. The objective function may comprise a neighborhood component analysis objective function that includes the robust loss function. The device may determine the weights for the potential features using the objective function. The determining may comprise optimizing a value of the objective function for each potential feature. The weights may represent predictive powers of corresponding potential features. The device may provide the weights for the potential features.

22 Claims, 7 Drawing Sheets

(56) References Cited

OTHER PUBLICATIONS

Zhu et al., "Matrix-Similarity Based Loss Function and Feature Selection for Alzheimer's Disease Diagnosis", CVFPR2014 (Year: 2014).*

MathWorks, "Feature Selection", http://www.mathworks.com/help/stats/feature-selection.html?s_tid=gn_loc_drop, 2017, 1 page.

* cited by examiner

```
TCE 220                                                              □ □ ⊠
File   Edit   Tools   View   Execute lambdavals  = linspace(0,3,50)*std(y)/length(y);                    ┌─402
    cvp         = cvpartition(length(y),'kfold',5);
    numtestsets = cvp.NumTestSets;
    lossvals    = zeros(length(lambdavals),numtestsets);

for i = 1:length(lambdavals)
      for k = 1:numtestsets

Xtrain = X(cvp.training(k),:);
        ytrain = y(cvp.training(k),:);
        Xtest  = X(cvp.test(k),:);
        ytest  = y(cvp.test(k),:);

nca = fsrnca(Xtrain,ytrain,'FitMethod'...,'exact','Solver',...
    404 ──▶  'sgd','Verbose',0,'Lambda',lambdavals(i),'LossFunction',...
             'epsiloninsensitive','Epsilon',0.8);

lossvals(i,k) =loss(nca,Xtest,ytest,'LossFunction','mse');

end
    end
```

FIG. 4A

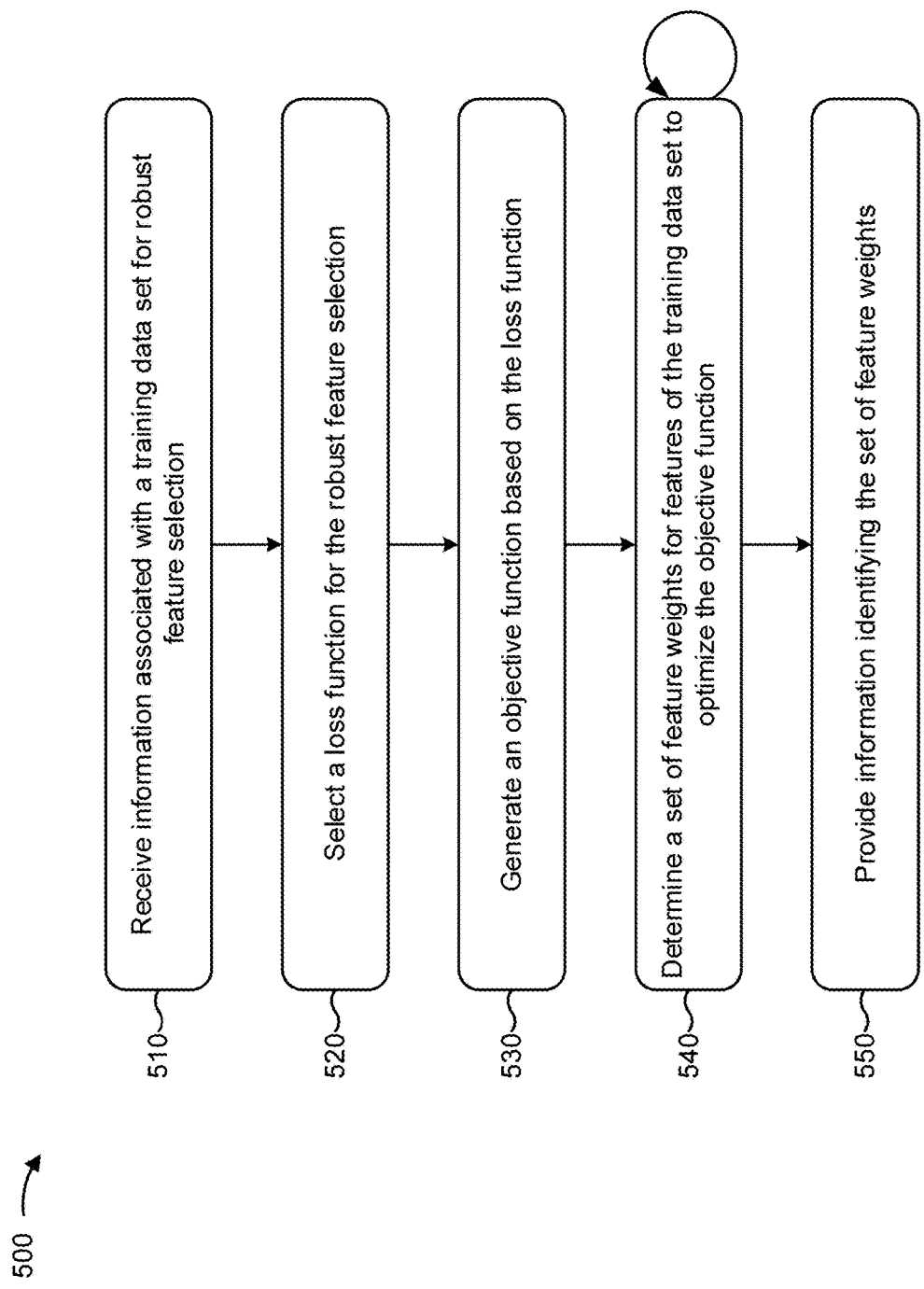

SYSTEMS AND METHODS FOR ROBUST FEATURE SELECTION

BRIEF DESCRIPTION OF THE DRAWINGS

FIGS. 4A-4C are diagrams of an example implementation of robust feature selection; and FIG. 5 is a flow chart of an example process for robust feature selection.

DETAILED DESCRIPTION

Figure 1:
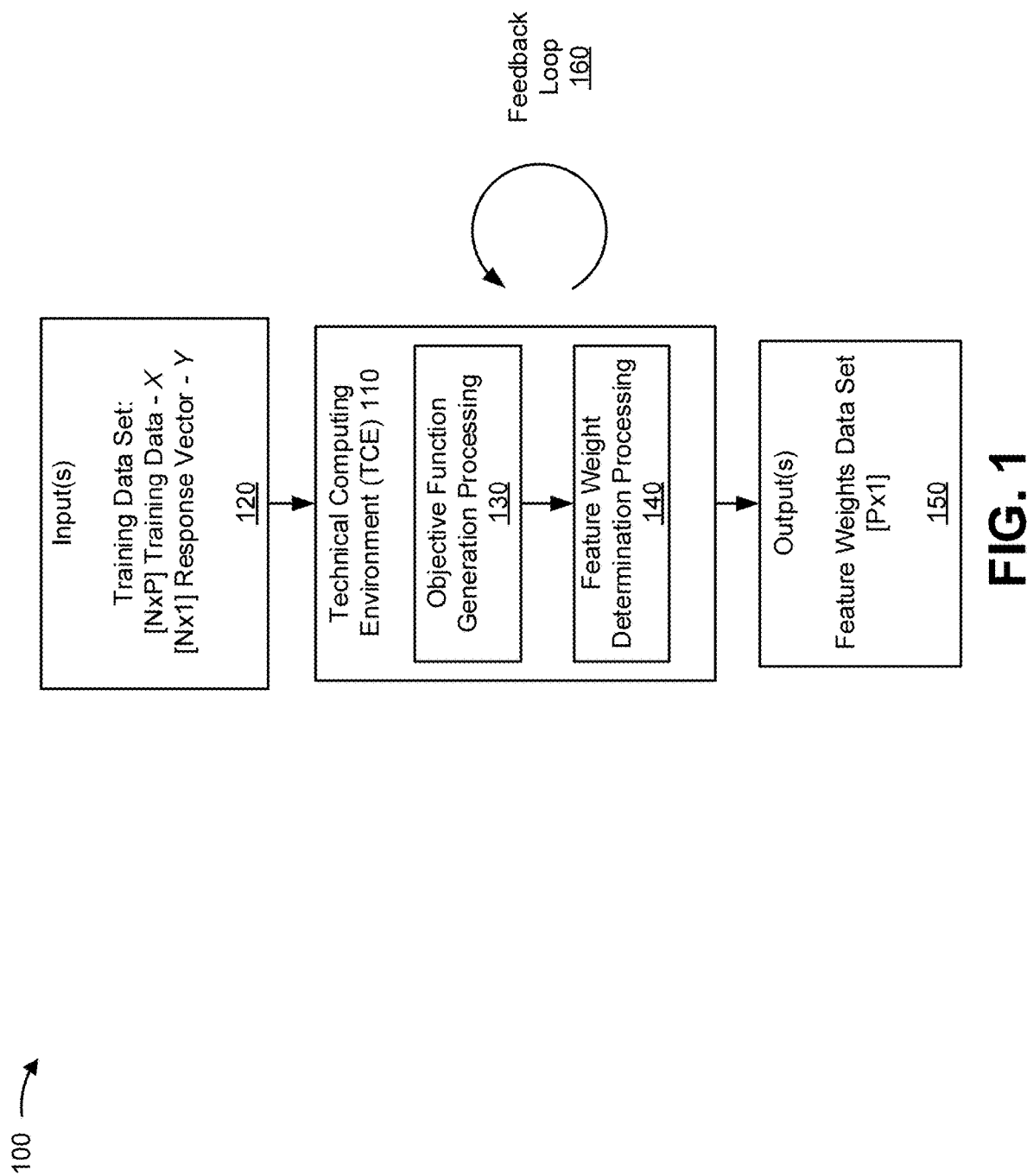
FIG. 1 is a diagram of an overview of an example implementation described herein.

The following detailed description of example implementations refers to the accompanying drawings. The same reference numbers in different drawings may identify the same or similar elements.

In machine learning, a model may be trained to perform a prediction regarding a system. For example, in a context of weather prediction, a model may be trained to receive input data regarding the weather (e.g., temperature data, humidity data, wind speed data, etc.) and generate output data regarding a prediction for the weather (e.g., a probability of rain at a future time, a temperature at a future time, etc.). As another example, in a context of energy management, a model may be trained to receive input data regarding energy usage (e.g., historical energy usage data, historical price data, etc.) and generate output data regarding a prediction for energy management (e.g., a determination of whether to buy or sell energy supply in an energy market). As yet another example, in a context of biology, a model may be trained to receive input data regarding tissue (e.g., results of a mammogram, patient history data, etc.) and generate output data classifying the tissue (e.g., a classification of a type of the tissue, a type of cancer, etc.).

In some contexts, input data may include hundreds, thousands, or even millions of types of data and thousands, millions, or even billions of data points. For example, in the context of weather prediction, input data may include decades of measurements of temperature, humidity, wind speed, or the like. Feature selection may be performed to reduce a dimensionality of data. In other words, feature selection may be performed to select only a subset of input data to train a model and use in the model for a prediction. For example, in the context of weather prediction, it may be determined that to train a model regarding a temperature next week humidity measurements from greater than 50 years ago need not be included in training the model and/or performing a prediction as the humidity measurements have less than a threshold relation to the temperature next week. In contrast, temperature measurements from the last 10 days may be included in training the model and/or performing a prediction as the temperature measurements have greater than a threshold relation to the temperature next week. Similarly, in the context of tissue classification, data regarding a patient family history of broken bones may be omitted and data regarding a patient family history of cancer may be included in training a model to classify tissue as cancerous.

By performing feature selection, a subset of potential features of the input data may be selected as features (also referred to as "predictor variables") to use in determining values (e.g., quantitative values or categorical values) of the desired output of the model (also referred to as "target variables"). A model may be trained such that input of data corresponding to the features results in an output of a prediction. The features may be selected based on a determination that a predictive error for the output of the model using a model trained using the features is optimized. Some implementations, described herein, may provide systems and methods for robust feature selection. For example, a set of weights for features relevant for training a model may be identified using robust feature selection, and a model may be trained with an improved predictive accuracy relative to other techniques for feature selection. Some implementations, described herein, may use a neighborhood component analysis technique for robust feature selection. Some implementations, described herein, may avoid computationally complex calculations associated with other, non-robust feature selection techniques, thereby reducing a utilization of computing resources.

FIG. 1 is a diagram of an overview of an example implementation 100 described herein. Example implementation 100 may be performed by a device, such as a client device, a server device, or the like.

With reference to FIG. 1, robust feature selection may be performed for a model. One or more inputs 120 may be received by technical computing environment (TCE) 110, and TCE 110 may provide one or more outputs 150. The inputs 120 may include an [N×P] training data set, X, where N is a quantity of observations and P is a quantity of potential features that can be selected during robust feature selection. The inputs 120 may include a [N×1] response vector, Y, of data for responses of the potential features. In some implementations, X may be represented as a matrix type of data set. In this case, each column of X may represent values of a single potential feature. In other examples, other data structure formats may be used, such as a matrix with each row representing values of a single feature, an array, or the like.

Some of the potential features of X can be relevant in predicting Y than other potential features of X. Some of the potentials feature can be irrelevant in predicting Y. By performing robust feature selection, as described herein, TCE 110 may determine weights for potential features using an objective function with a robust loss function. Based on the weights, TCE 110 may identify a subset of potential features that are more relevant for predicting Y than the other potential features, and may select the subset of potential features as predictor variables (which may be termed "selected features"). TCE 110 may determine selected features for use in training a model to perform a prediction, such as for training a weather model to perform a temperature prediction, an energy management model to perform an energy transaction prediction, a tissue classification model to perform a tissue classification, or the like. Based on performing feature selection to select features that are more relevant in predicting a response based on input data, dimension reduction may be performed for a prediction by selecting a subset of input data corresponding to the selected features, and using the subset of input data to generate the prediction (e.g., a subset of input data of inputs 120 used to train the model and determine a prediction, subsequent input data corresponding to the selected features and used to determine a prediction based on the model, etc.) rather than all of the input data. Dimension reduction on the input data may result in a reduced amount of time to train and/or utilize a model, a reduced utilization of processing resources to train and/or utilize the model, as compared to using the full set of input data without reduction.

As further shown in FIG. 1, and by reference number 130, TCE 110 may perform objective function generation processing on inputs 120. For example, TCE 110 may generate an objective function that includes a regularization term and a loss term, and may optimize the objective function to determine a set of weights for potential features. The objective function may take a form to use a neighborhood component analysis technique. Neighborhood component analysis may refer to a supervised learning technique for classifying multivariate data into classes based on a distance metric. The distance metric may refer to a distance between elements of a set. In this case, the elements of the set may refer to observations of inputs 120 (e.g., values for potential features), and the distance metric may refer to a weighted distance between observations, as described herein. In some implementations, an objective function for neighborhood component analysis may take the form:

$$f(w) = L + R \qquad (1)$$

where L represents a loss term, R represents a regularization parameter, and $f(w)$ represents the objective function for a set of weights, w, which may be a [P×1] vector of scalars corresponding to a dimension of a total number of potential features that are to be determined for robust feature selection. TCE 110 may select a robust loss function for the loss term, L. TCE 110 may select the robust loss function from a stored set of types of robust loss function. For example, TCE 110 may select the robust loss function based on a characteristic of inputs 120 (e.g., a first type of loss function may be used for a first type of data and a second type of loss function may be used for a second type of data). Additionally, or alternatively, TCE 110 may train multiple models using multiple loss functions, and may select a particular loss function (and a particular model) based on an accuracy of the multiple models in performing predictions for a validation data set. Additionally, or alternatively, TCE 110 may provide a user interface and detect a user interaction with the user interface that specifies a robust loss function (i.e., a user configured robust loss function). A robust loss function may refer to a loss function that results in a twice differentiable objective function. For example, a loss term with a selected robust loss function may take the form:

$$L = \frac{1}{N} \sum_{i=1}^{N} \left( \sum_{j=1, j \neq i}^{N} p_{ij} \ell(y_i, y_j) \right) \qquad (2)$$

$$\ell(y_i, y_j) = (y_i - y_j)^2 \qquad (3)$$

where $\ell$ represents the loss of the loss function, $y_i$ represents a response i of Y, $y_j$ represents a response j of Y, N represents a quantity of responses of Y, $\ell(y_i, y_j)$ collectively represents the loss, $\ell$, between $y_i$ and $y_j$, $p_{ij}$ represents a probability that a point j is a reference point for a point i (which is related to a weighted distance between $x_i$ and $x_j$, which correspond to data points of X), and where (3) collectively represents a squared loss type of loss. In some implementations, TCE 110 may vectorize the loss function to improve an efficiency of computing. TCE 110 may determine that a memory size for a matrix of data in optimization of the loss function is larger than a threshold memory size, and may partition data of the optimization of the loss function into data groups where each data group requires less than the threshold memory size. In another example, the loss may take the forms:

$$\ell(y_i, y_j) = |y_i - y_j| \qquad (4)$$

$$\ell(y_i, y_j) = \max(0, |y_i - y_j| - \varepsilon) \qquad (5)$$

where (4) represents a least absolute deviations ($L_1$) loss and (5) represents an ε-insensitive loss, where the epsilon value, c, represents an insensitivity parameter value, that results in errors less than the insensitivity parameter value being discarded. In some implementations, the value for the insensitivity parameter may be selected by TCE 110 from a range of values that may be determined based on the inputs 120, as a default value, or the like. Other loss functions may be considered, such as an absolute value loss function:

$$\ell_i = |t_i - y_i| \qquad (6)$$

$$t_i = \sum_{j=1, j \neq 1}^{N} p_{ij} y_j \qquad (7)$$

where $t_i$ represents a predicted value for an observation $x_i$, $p_{ij}$ represents a probability that a point j is a reference for a point i, and $y_j$ represents a response for an observation j, and where $|t_i - y_i|$ represents the absolute value loss function. However, the inclusion of terms, such as $|t_i - y_i|$, which results in $p_{ij}$ being inside the loss function $\ell_i$, may result in the objective function, $f(w)$, in (1) not being at least twice continuously differentiable at all points, such as when the loss function is not twice continuously differentiable at all points. In other words, it is desirable for $f(w)$ to be smooth to permit optimization (e.g., gradient based optimization, Hessian based optimization) to converge to a solution for a set of weights for a set of potential features, as described herein, more efficiently than for a non-smooth objective function. Accordingly, TCE 110 may reduce utilization of processing resources relative to a longer optimization period.

The regularization term, R, may take the form:

$$R = \lambda \sum_{r=1}^{P} w_r^2 \qquad (8)$$

where λ represents a regularization parameter and $w_r$ represents a weight corresponding to a potential feature of index value r. In some implementations, the regularization term is introduced to reduce a likelihood of overfitting when optimizing the objective function. The regularization parameter, ×, represents a configurable weighting for the regularization term corresponding to an extent to which overfitting is to be avoided. When λ is 0, TCE 110 optimizes the loss term L of equation (1) only, which may result in an overfit condition. In contrast, when λ increases to a maximum value, the regularization term dominates the optimization (i.e., the regularization term is associated with a stronger contribution to the optimization than the loss term). In this case, an underfit condition may result. TCE 110 may select an intermediate λ value to balance a likelihood of an overfit condition with a likelihood of an underfit condition. In some implementations, the λ value may be selected as a multiple of 1/N, which may result in a minimization of a generalization error in predicting new responses for new input data. In some implementations, TCE 110 may select a set of candidate regularization parameters, determine an error associated with each candidate regularization parameter, and may select a regularization parameter from the candidate regularization parameters based on the error. Although described herein in terms of a particular form for the regularization parameter, other techniques for regularization may be used, which may be associated with other forms.

As further shown in FIG. 1, and by reference number 140, TCE 110 may perform feature weight determination processing. For example, TCE 110 may determine a set of feature weights, w, that correspond to a result of evaluating the objective function, which includes the robust loss function. In some implementations, TCE 110 may evaluate the objective function $f(w)$ of equation (1) using a particular optimization technique, which may be termed an optimizer. For example, TCE 110 may utilize a first-order optimization method or a second-order optimization method, such as a limited memory Broyden-Fletcher-Goldfarb-Shanno (BFGS) algorithm, a stochastic gradient descent (SGD) optimization method, or a combination thereof. As shown by reference number 160, TCE 110 may perform an iterative process. TCE 110 may iteratively select potential sets of weights and evaluate the objective function using each potential set of weights to select a particular set of weights associated with a minimized amount of error, which may be termed a selected set of weights. In some implementations, TCE 110 may optimize the objective function by iteratively evaluating the objective function to obtain one or more results that satisfy a threshold tolerance to error (i.e., a user configurable acceptable amount of error). In some implementations, TCE 110 may optimize the objective function by minimizing the objective function, maximizing the objective function, or the like. In some implementations, to minimize the objective function, TCE 110 may iteratively evaluate an objective function that includes a general loss function of the form:

$$\hat{w} = \mathrm{argmin}_w f^{new}(w) = \left(\frac{1}{N}\sum_{i=1}^{N} l_i\right) + \left(\lambda \sum_{r=1}^{P} w_r^2\right) \quad (9)$$

$$l_i = \sum_{j=1, j \neq i}^{N} p_{ij}(w) \ell(y_i, y_j) \quad (10)$$

where $\hat{w}$ represents the selected set of weights, w represents each candidate set of weights that is considered when iteratively executing the objective function to determine the particular set of weights that minimizes w, $\ell$ represents a loss function, $I_i$ represents a contribution of observation i to the total loss, and $p_{ij}$ represents a probability that a point j is a reference for a point i, as described further, herein.

TCE 110 may provide, as output 150, information identifying the selected set of weights (which may be termed "feature weights") as a [P×1] data set. The [P×1] data set may represent a relevance of each potential feature to the responses. The range of values of the [P×1] data set may be based on the range of values or type of values of inputs 120. Potential features associated with a threshold feature weight may be selected as features for training a model. TCE 110 may select a subset of potential features as the features based on the features having a feature weight that satisfies (i.e., is greater than) a threshold. In this case, TCE 110 may classify the remaining subset of potential features as not being features (i.e., as being irrelevant or with less than a threshold degree of relevance) for use in training a model. In this way, TCE 110 may reduce a dimensionality of input data to a subset of input data relating to the features that are selected based on the feature weights.

In some implementations, the output 150 can be the feature weights. In some implementations, the output 150 can be the features that are selected by TCE 110. In some implementations, the output 150 can be a trained model or a prediction determined based on the trained model. For example, in a weather prediction context, optimizing the objective function trains a model for weather prediction and, based on receiving inputs 120 including input data for making a prediction (e.g., data that is separate from the data used for training the model), TCE 110 may utilize the input data and the model to determine a weather prediction, and may provide the weather prediction as an output. Additionally, or alternatively, TCE 110 may provide the model for storage (e.g., for use in another computing environment, such as another TCE 110).

As indicated above, FIG. 1 is provided merely as an example. Other examples are possible and can differ from what was described with regard to FIG. 1.

Figure 2:
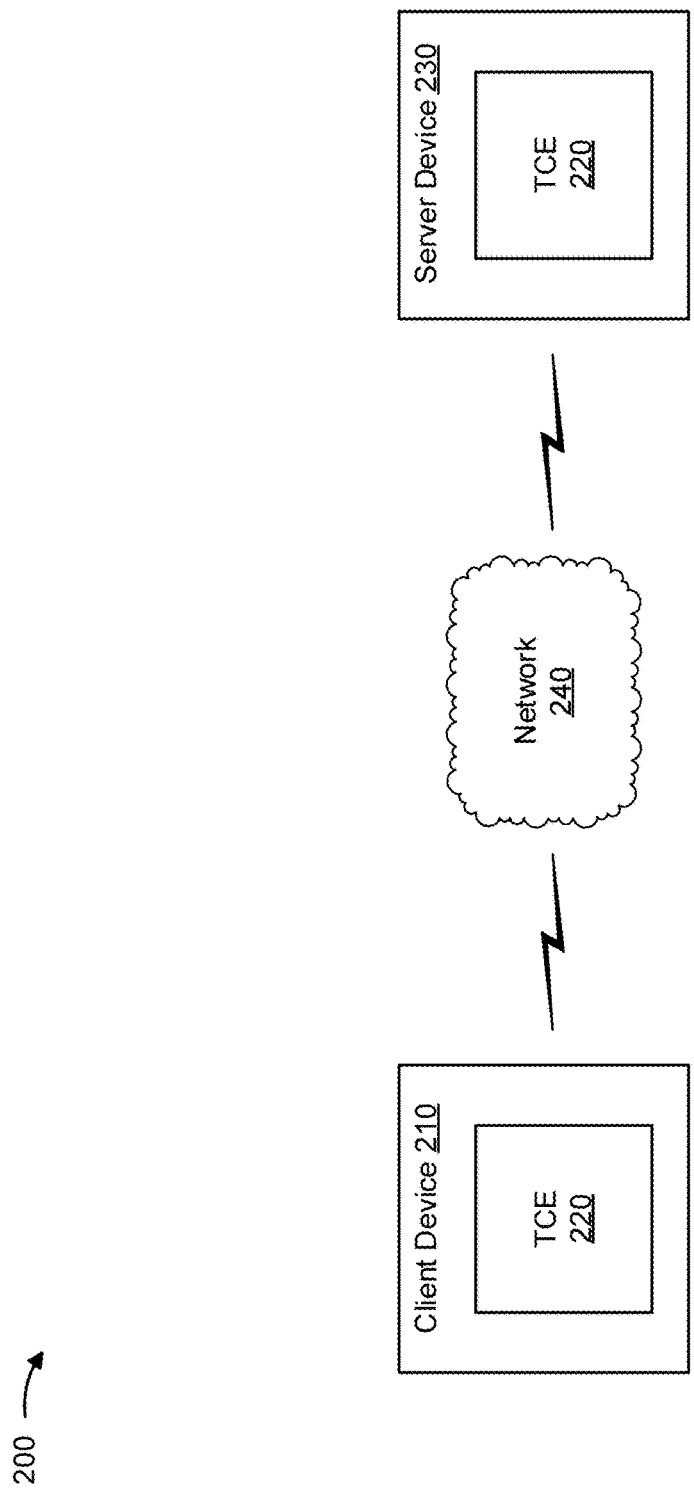
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, processing, and/or providing program code and/or information associated with program code. For example, client device 210 may include a computing device, such as a desktop computer, a laptop computer, a tablet computer, a mobile phone (e.g., a smart phone, a radiotelephone, etc.), or a similar device. In some implementations, client device 210 may perform robust feature selection to identify a set of features for training a model. In some implementations, client device 210 may train the model based on a result of performing robust feature selection. In some implementations, client device 210 may receive information from and/or transmit information to server device 230.

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software by The MathWorks, Inc.), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

TCE 220 may include, for example, a user interface that provides program code and/or information associated with program code. For example, TCE 220 may include an application programming interface that permits a set of application programming interface calls using program code to cause TCE 220 to perform robust feature selection. In some implementations, TCE 220 corresponds to TCE 110 shown in FIG. 1.

Server device 230 may include one or more devices capable of receiving, generating, storing, processing, and/or providing program code and/or information associated with program code. For example, server device 230 may include a computing device, such as a server, a desktop computer, a laptop computer, a tablet computer, or a similar device. In some implementations, server device 230 may host TCE 220. In some implementations, client device 210 may be used to access one or more TCEs 220 running on one or more server devices 230. For example, multiple server devices 230 may be used to execute program code (e.g., serially or in parallel), and may provide respective results of executing the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution). Additionally, or alternatively, server device 230 may perform one, more, or all operations described elsewhere herein as being performed by client device 210. In some implementations, client device 210 or server device 230 may utilize multi-threaded computation to perform robust feature selection using a multi-core central processing unit (CPU). In some implementations, client device 210 or server device 230 may vectorize data and/or partition data to improve an efficiency of loss function optimization. In some implementations, client device 210 or server device 230 may utilize another type of optimization. In some implementations, client device 210 or server device 230 may operate in another environment, such as a non-cloud parallel environment or the like.

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
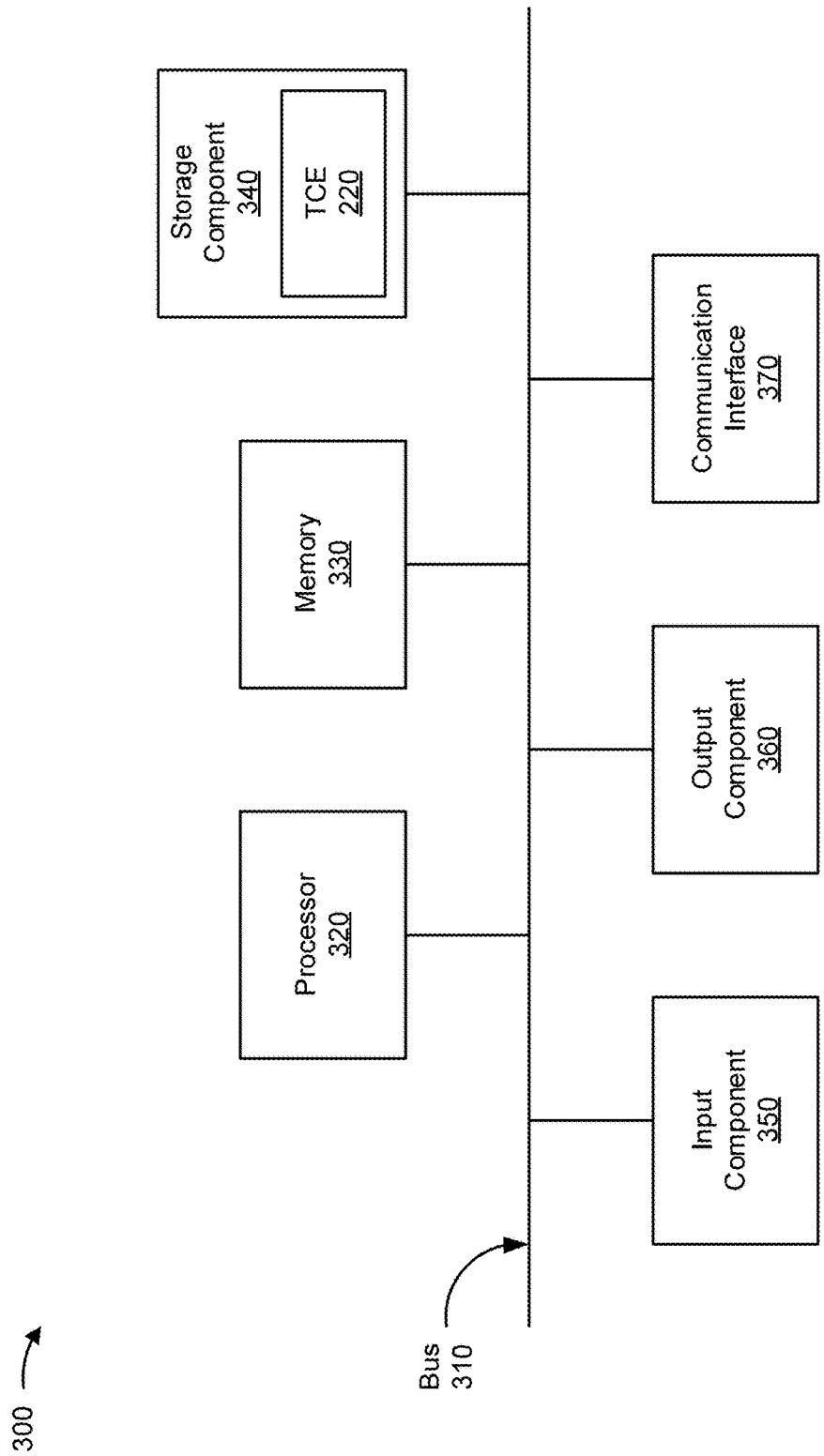
FIG. 3 is a diagram of example components of one or more devices of FIG. 2.

FIG. 3 is a diagram of example components of a device 300. Device 300 may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. In some implementations, storage component 340 may store TCE 220.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4B:
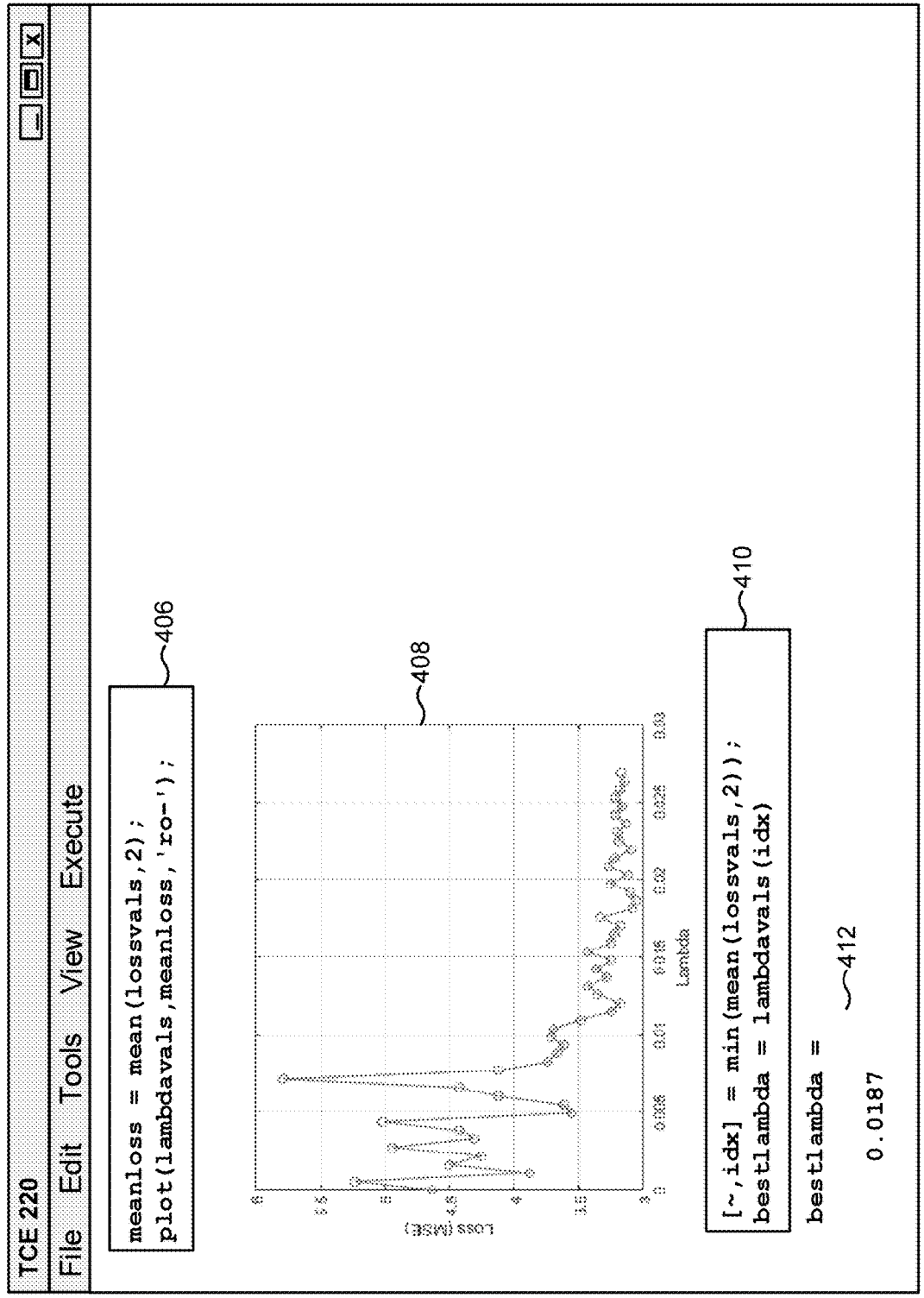
Figure 4C:
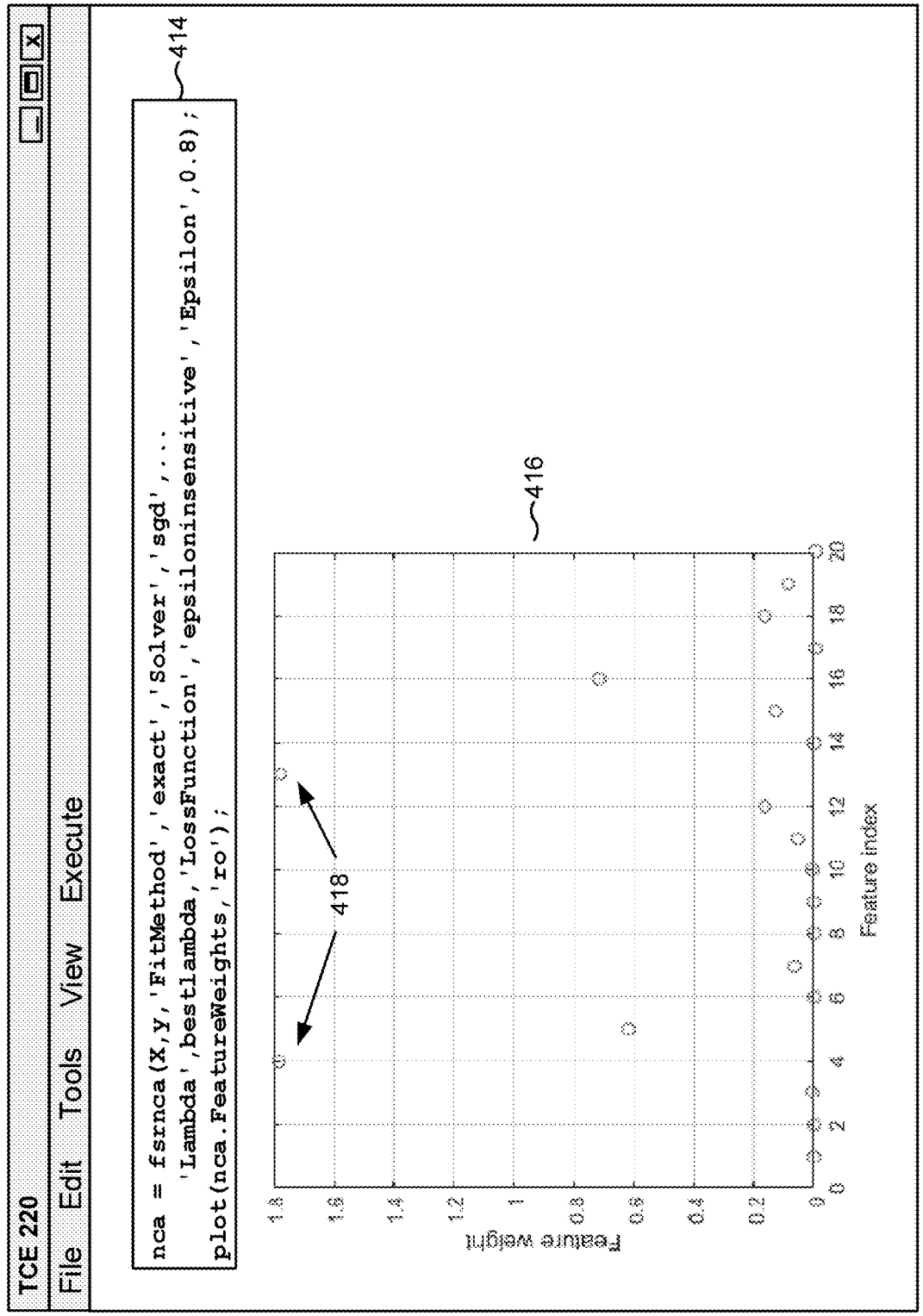

FIGS. 4A-4C are example diagrams 400 of user interfaces relating to systems and methods for robust feature selection. FIGS. 4A-4C show an example of utilizing a user interface associated with TCE 220 of client device 210 to perform robust feature selection for an input data set.

With regard to FIGS. 4A-4C, assume that client device 210 receives, as an input data set, an N-by-P (e.g., 200-by-20) predictor matrix X of data, and an N-by-1 (e.g., 200-by-1) response vector y. Further assume that the response vector depends on three of the features of X (e.g., features 4, 7, and 13). In other words, features 4, 7, and 13 are relevant in predicting y, and other features (e.g., 1, 2, 3, 5, 6, 8, . . . ) are irrelevant in predicting y. The input data set may relate to a system, such as a data set of weather data, a data set of financial data, a data set of health data, a data set of energy data, or the like. For example, when the input data set is weather data, and the responses relate to a temperature prediction, features 4, 7, and 13 may correspond to a temperature at a time step before a prediction, a wind speed at a time step before the prediction, and a humidity at a time step before a prediction, which may each be relevant to predicting a temperature. In contrast, other features may correspond to, for example, barometric pressure at another location at a time step greater than a threshold amount of time before the prediction, an amount of rain fall, or the like, which may be irrelevant to predicting a temperature.

As shown in FIG. 4A, and by reference number 402, client device 210 (e.g., TCE 220) receives a set of instructions 402 to use a robust loss function for robust feature selection. In this case, the set of instructions 402 may cause client device 210 to use an epsilon-insensitive loss function to perform neighborhood component analysis and determine a set of loss values, as shown by reference number 404 (nca=fsrnca( . . . 'epsiloninsensitive', . . . )):

$$\ell(y_i, y_j) = \max(0, |y_i - y_j| - \epsilon) \quad (11)$$

where $\ell(y_i, y_j)$ represents a $\epsilon$-insensitive loss function. In this way, based on client device 210 executing the set of instructions 402, client device 210 determines the set of loss values (lossvals(i,k)= . . . ) for a set of potential $\lambda$ parameters and select a particular $\lambda$ value for the objective function. In some implementations, client device 210 may perform a partitioning procedure when performing the neighborhood component analysis. In this case, based on receiving other instructions or based on determining that partitioning is to be performed, client device 210 may partition the data into k-folds (e.g., data selected using a random or pseudo-random selection technique, based on a user selection, or the like), and may use a first quantity of folds of the k-folds as a training set and a second quantity of folds of the k-folds as a validation set.

The value for k may be a configurable quantity for k-fold cross-validation. In k-fold cross-validation a first partition of the input data may be retained as validation data for testing a model and remaining k−1 partitions may be used for training data, and client device 210 may provide averaging of results of training the model using each of the k−1 partitions to determine a single result. Client device 210 may select a value fork (e.g., a value greater than or equal to 2) based on a user selection, based on a default value, or the like. In another example, client device 210 may receive another command identifying a selection of a $\lambda$ parameter that is to be used as the $\lambda$ parameter, a selection of a $\lambda$ parameter that is to be used as an initial $\lambda$ parameter and subsequently tuned, or the like.

As shown in FIG. 4B, and by reference number 406, client device 210 (e.g., TCE 220) receives a set of instructions 406 to determine and graphically represent a mean loss for the loss values. For example, the set of instructions 406 may cause client device 210 to determine a mean loss for each lambda parameter based on loss values for each lambda parameter, and provide a graphical representation 408 of the mean loss values. In this case, the loss values range from 0 to 6 for a group of lambda parameters ranging from between 0 and 0.03. As shown by reference number 410, client device 210 receives a set of instructions 410 to determine a minimum average loss based on the mean loss values. The set of instructions 410 cause client device 210 to provide output 412 of a $\lambda$ parameter value that results in a minimum average loss (e.g., bestlambda=0.0187).

As shown in FIG. 4C, and by reference number 414, client device 210 receives a set of instructions 414 to fit a robust feature selection model using the $\epsilon$-insensitive loss function and the $\lambda$ value that results in the minimum average loss. In this case, the set of instructions 414 may cause client device 210 to generate the robust feature selection model (e.g., nca=fsmca(X,y, . . . )), and to provide plot 416 to identify a set of feature weights for features of the robust feature selection model (e.g., plot(nca.FeatureWeights, . . . ). Client device 210 generates plot 416 and provides plot 416 via the user interface.

As further shown in FIG. 4C, and by reference number 418, a subset of features are associated with relatively high feature weights relative to other features. For example, client device 210 identifies a feature weight of approximately 1.8 for feature 4 and feature 13 relative to feature weights of approximately 0 for, for example, features 1, 2, 3, 8, etc. In this case, feature 4 and feature 13 may be selected as features for the data set. As a result, client device 210, using robust feature selection accurately identifies 2 of the 3 features (e.g., a failure to correctly identify feature 7 as a feature), which is an improvement over using a non-robust feature selection technique.

As indicated above, FIGS. 4A-4C are provided merely as an example. Other examples are possible and may differ from what was described with regard to FIGS. 4A-4C.

FIG. 5 is a flow chart of an example process 500 for robust feature selection. In some implementations, one or more process blocks of FIG. 5 may be performed by client device 210. In some implementations, one or more process blocks of FIG. 5 may be performed by another device or a group of devices separate from or including client device 210, such as server device 230.

As shown in FIG. 5, process 500 may include receiving information associated with a training data set for robust feature selection (block 510). For example, client device 210 may receive, as input, a data set to perform robust feature selection for machine learning.

In some implementations, the received information may include a set of parameters relating to performing robust feature selection using neighborhood component analysis. For example, client device 210 may receive values of a feature selection object. Additionally, or alternatively, the received information may identify a property of the feature selection object, such as an initial feature weight, a λ value, a set of user preferences (e.g., whether the user requests to provide or configure the λ value, a criterion relating to evaluating fit of a model, etc.), or the like. In some implementations, the received information may include program code. In some implementations, the received information may include the training data set. For example, client device 210 may receive weather data, financial data, medical data, or the like associate with training a model to perform a weather prediction, a financial prediction, a medical prediction, or the like. In some implementations, the received information may include a selection of a loss function that is to be used for robust feature selection. In some implementations, the received information may include a specification of observation weights to indicate relative importance of observations. In some implementations, for a classification problem, the received information may include a specification of class priors.

As further shown in FIG. 5, process 500 may include selecting a loss function for the robust feature selection (block 520). For example, client device 210 (e.g., TCE 220) may select a robust loss function, from a set of loss functions, to cause an objective function, generated based on the robust loss function, to be continuously twice differentiable.

An arbitrary loss function may be determined to maintain robust properties of the feature selection without introducing a loss term that is not continuously differentiable. For example, client device 210 may determine an arbitrary loss function by using a loss term of the form $(y_j-y_i)^2$. As a result, client device 210 determines:

$$l_i = \sum_{j=1, j \neq i}^{N} p_{ij}(y_i - y_j)^2 \quad (12)$$

where $(y_j-y_i)^2$ represents a squared loss function for a loss between $y_i$ and $y_j$ and $I_i$ represents an average loss for observation i, and $p_{ij}$ represents a probability that a point j in the input data is a reference for a point i in the input data, which may correspond to a closeness of point j to point i. Similarly, client device 210 may generalize to other loss functions $\ell(y_i, y_j)$:

$$l_i = \sum_{j=1, j \neq i}^{N} p_{ij}\ell(y_i, y_j) \quad (13)$$

$$\ell(y_i, y_j) = |y_i - y_j| \quad (14)$$

$$\ell(y_i, y_j) = \max(0, |y_i - y_j| - \varepsilon) \quad (15)$$

where (14) represents an example of a first type of loss function (e.g., a least absolute deviations ($L_1$) loss), and where (15) represents an example of a second type of loss function $\ell$ (e.g., an ε-insensitive loss). Each loss function may result in an objective function, as described in more detail herein, that is continuously twice differentiable. Thus, client device 210 may subsequently perform optimization for feature weights efficiently relative to another type of loss function.

As further shown in FIG. 5, process 500 may include generating an objective function based on the loss function (block 530). For example, client device 210 may generate a twice differentiable objective function that includes the robust loss function in a loss term and a regularization parameter in a regularization term. The objective function may take the form:

$$f(w) = L + R \quad (16)$$

$$L = \left(\frac{1}{N}\sum_{i=1}^{N} l_i\right) \quad (17)$$

$$R = \left(\lambda \sum_{r=1}^{P} w_r^2\right) \quad (18)$$

where $f(w)$ is an objective function, L represents the loss term including robust loss function 1, and R is a regularization term including regularization parameter λ. In some implementations, client device 210 may generate the objective function based on a neighborhood component analysis technique. For example, client device 210 may determine a weighted distance between data points $x_i$, and $x_j$ of a data set of X As further shown in FIG. 5, process 500 may include determining a set of feature weights for features of the training data set to optimize the objective function (block 540). For example, client device 210 may assign each feature a weight, such that w is a P-by-1 vector of feature weights, and may calculate a weighted distance between $x_i$ and $x_j$:

$$d_w(x_i, x_j) = \sum_{r=1}^{P} w_r^2 |x_{ir} - x_{jr}| \quad (19)$$

where $d_w$ represents a weighted distance between $x_i$ and $x_j$, N data points are included in X such that $\{(x_i, y_i), i=1, \ldots, N\}$, and where $x_i$ are P-by-1 predictors and $y_i$ is a response value. Although (19) provides an example of $d_w$, other examples are possible. For example the term, $|x_{ir}-x_{jr}|$, may be replaced with a corresponding term, $(x_{ir}-x_{jr})^2$, which may correspond to a squared weighted distance. When $w_r$ is 0, then a predictor r is determined to not contribute to $d_w$. A probability that a data point j is a reference point for another data point i may be determined:

$$p_{ij} \propto \exp\left(-\frac{d_w(x_i, x_j)}{\sigma}\right) \quad (20)$$

where $p_{ij}$ represents the probability that j is a reference point for i. Although described herein in terms of a particular kernel function K=exp( . . . ), in another example, another kernel function may be possible other than exp( . . . ). In some implementations, $p_{ij}$ may account for an effect of class priors in a classification problem:

$$p_{ij} \propto w_j^{obs} K(d_w(x_i, x_j)) \quad (21)$$

where $w_j^{obs}$ represents an effective observation weight for an observation j. In a regression problem, a value of $w_j^{obs}$ may be a set of received weights scaled to sum to N. In contrast, in a classification problem, a value of $w_j^{obs}$ may be scaled to be equal to a class prior for each class, and then subsequently scaled to sum to N.

Based on this, points relatively close to i as determined based on $d_w$, are more likely to be reference points for i. In this case, a point i is not a self-reference point, thus $p_{ii}=\Delta$, where $\Delta$ is a special value for self-reference (e.g., 0).

Considering the squared loss function, a predicted value may be determined for an observation:

$$t_i = \sum_{j=1, j\neq i}^{N} p_{ij} y_j \qquad (22)$$

where $t_i$ represents a predicted value for $x_i$, and where $p_{ij}$ relates to a set of weights, w. In this case, w is determined using an objective function using a squared loss function, as:

$$l_i = \sum_{j=1, j\neq i}^{N} p_{ij}(y_i - y_j)^2 \qquad (23)$$

$$\hat{w} = \operatorname{argmin}_w f^{new}(w) = \left(\frac{1}{N}\sum_{i=1}^{N} l_i\right) + \left(\lambda \sum_{r=1}^{P} w_r^2\right) \qquad (24)$$

Similarly, client device 210 may generalize to other loss functions $l(y_i, y_j)$:

$$\ell(y_i, y_j) = |y_i - y_j| \qquad (25)$$

$$\ell(y_i, y_j) = \max(0, |y_i - y_j| - \varepsilon) \qquad (26)$$

where (25) represents an example of a first type of loss function $\ell$ (e.g., a least absolute deviations ($L_1$) loss), and where (26) represents an example of a second type of loss function $\ell$ (e.g., an ε-insensitive loss). Other types of loss functions are possible, such as a bisquare loss function, an arbitrary loss function, or the like. In these cases, $p_{ij}$ relates to w and is outside of the respective loss functions, which may result in the respective $f^{new}(w)$ being smooth even when the respective loss function is not smooth. Thus, client device 210 may perform optimization efficiently relative to using non-robust loss functions. In this way, client device 210 reduces a utilization of computing resources relative to performing optimization using a loss function that results in non-differentiability.

In some implementations, client device 210 may optimize the weights for training a model based on a particular fitting technique. For example, client device 210 may use a neighborhood component analysis fitting technique, such as using all data of a data set, using partitioned portions of data of the data set (e.g., a first portion for a training set, a second portion for a validation set, etc.), or the like. In some implementations, client device 210 may optimize the weights for training the model using a particular type of solver or optimizer, such as a limited memory Broyden-Fletcher-Goldfarb-Shanno (BFGS) algorithm based solver, a stochastic gradient descent (SGD) based solver, a combination of a limited memory BFGS (LBFGS) solver and a SGD solver, or the like. In some implementations, client device 210 may modify results of performing robust feature selection to tune one or more parameters, such as the regularization parameter or the like. In this case, client device 210 may alter a feature selection object using modified model parameters, such as a modified λ parameters, and may re-optimize the weights for training the model by altering the feature selection object. In this way, client device 210 reduces a utilization of computing resources, relative to requiring each step of robust feature selection to be performed.

As further shown in FIG. 5, process 500 may include providing information identifying the set of feature weights (block 550). For example, client device 210 may provide the feature weights for display via a user interface, may train a model using the feature weights and may provide a prediction using the model, or the like.

In some implementations, client device 210 may train a model (e.g., a classification model or a regression model) using a machine learning technique and based on the results of performing robust feature selection, and may provide the model. For example, using a set of features selected based on performing robust feature selection, client device 210 may train a model for classification of a data set, regression of the data set, to predict values of the data set, or the like.

In some implementations, client device 210 (e.g., TCE 220) may store information identifying a set of features. In this case, client device 210 may store the feature selection object that identifies a set of selected features. Additionally, or alternatively, client device 210 may store a model trained using features identified in the feature selection object. In this case, client device 210 may store the feature selection object or model in memory, store a reference to the feature selection object or model in memory, or the like.

In some implementations, client device 210 may display a representation of the feature selection object in a user interface. For example, client device 210 may display a textual representation of the feature selection object in the user interface. In some implementations, client device 210 may display a graphical representation of the feature selection object. For example, client device 210 may generate a diagram relating to the feature selection object to identify a set of selected features, a characteristic of the set of selected features (e.g., a determined level of predictive accuracy of the set of selected features), or the like.

In some implementations, client device 210 may provide results of performing machine learning via the user interface. For example, based on using robust feature selection using neighborhood component analysis to select features, client device 210 may use the features for machine learning (e.g., for classification or regression), and may provide a result of the machine learning for display or storage.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, client device 210 provides a robust feature selection using neighborhood component analysis. Moreover, based on providing the robust feature selection using neighborhood component analysis, client device 210 improves a usability and accessibility of robust feature selection techniques for users, thereby improving use of TCE 220. Furthermore, based on using robust feature selection using neighborhood component analysis to perform feature selection, client device 210 reduces a utilization of computing resources and improves an accuracy of models relative to using other techniques for feature selection.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Program code (sometimes referred to herein as code) is to be broadly interpreted to include text-based code that may not require further processing to execute (e.g., C++ code, Hardware Description Language (HDL) code, very-high-speed integrated circuits (VHSIC) HDL (VHDL) code, Verilog code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like. In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, etc.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A computer-implemented method, comprising:
   receiving a loss function, wherein the loss function is selected from the group consisting of a first loss function that is at least continuously twice differentiable and a second loss function that is not at least continuously twice differentiable;
   generating an objective function for determining weights for potential features corresponding to training data,
      the objective function being generated using the loss function such that the objective function is at least continuously twice differentiable,
      the objective function comprising a neighborhood component analysis objective function that includes the loss function as a first component of a term of the neighborhood component analysis objective function, wherein:
         the loss function is a function of a set of responses of the training data and not of the weights of the potential features; and
         the term further comprises a second component that is a function of the weights of the potential features;
   determining the weights for the potential features using the objective function,
      the determining comprising optimizing a value of the objective function for each potential feature,
      the weights representing predictive powers of corresponding potential features;
   providing the weights for the potential features;
   selecting, based on the weights for the potential features, a subset of the potential features of the training data as a set of selected features of the training data;
   training, using the training data and the set of selected features, a model of a system to perform a prediction; and
   providing the trained model.

2. The method of claim 1, further comprising:
   determining a training data set,
      the training data set including a matrix of data relating to the potential features,
      the training data set including the set of responses,
      the subset of the potential features being related to the set of responses; and where determining the weights for the potential features comprises:
  determining the subset of the potential features that are related to the set of responses using neighborhood component analysis; and
  selecting the subset of the potential features as the set of selected features.

3. The method of claim 1, wherein training the model further comprises:
  generating, based on the weights, a classification model or a regression model.

4. The method of claim 1, where the loss function is one of:
  a squared loss function,
  a bisquare loss function,
  an absolute value loss function,
  an arbitrary loss function, or
  a general loss function.

5. The method of claim 1, further comprising:
  receiving the second loss function that is not at least continuously twice differentiable to be the loss function.

6. The method of claim 1, further comprising:
  generating the objective function based on detecting an interaction with a user interface.

7. The method of claim 1, further comprising:
  providing, via a user interface, a representation relating to the weights for the potential features,
    the representation including at least one of:
      a graphical representation, or
      a textual representation.

8. A non-transitory computer-readable medium storing instructions, the instructions comprising:
  one or more instructions that, when executed by one or more processors, cause the one or more processors to:
    receive information associated with a data set as input;
    receive loss function, wherein the loss function is selected from the group consisting of a first loss function that is at least continuously twice differentiable and a second loss function that is not at least continuously twice differentiable;
    generate an objective function for determining weights for features corresponding to the data set using the loss function,
      the objective function being generated using the loss function such that the objective function is at least twice continuously differentiable,
      the objective function comprising a neighborhood component analysis objective function that includes the loss function as a first component of a term of the neighborhood component analysis objective function, wherein:
        the loss function is a function of a set of responses of the data set and not of the weights of the potential features; and
        the term further comprises a second component that is a function of the weights of the features;
    determine a set of weights for a set of potential features of the data set using the objective function;
    provide information identifying the set of weights;
    selecting, based on the set of weights for the set of potential features, a subset of the set of potential features of the data set as a set of selected features of the data set;
    training, using the data set and the set of selected features, a model of a system to perform a prediction; and
    providing the trained model.

9. The non-transitory computer-readable medium of claim 8, where the one or more instructions, when executed by the one or more processors, cause the one or more processors to:
  receive another input identifying at least one of:
    a regularization parameter, $\lambda$, for the data set,
    a fit method for the data set,
    an optimizer for the data set, or
    a set of user preferences relating to performing feature selection using neighborhood component analysis.

10. The non-transitory computer-readable medium of claim 8, where the one or more instructions, when executed by the one or more processors, cause the one or more processors to:
  determine, based on the data set, at least one of:
    an N-by-P matrix of the set of features of the data set,
    an N-by-1 response vector of the data set,
      the response vector including the set of responses corresponding to the set of features of the data set.

11. The non-transitory computer-readable medium of claim 8, where the one or more instructions cause the one or more processors to select the loss function, wherein the loss function comprises a least absolute deviations ($L_1$) loss or a $\varepsilon$-insensitive loss.

12. The non-transitory computer-readable medium of claim 8, where the one or more instructions, when executed by the one or more processors, cause the one or more processors to:
  partition the data set into a first set of portions to train the model and a second set of portions to validate the model; and
  determine a regularization parameter, $\lambda$, based on partitioning the data.

13. The non-transitory computer-readable medium of claim 8, where the one or more instructions, that cause the one or more processors to generate the objective function, cause the one or more processors to:
  determine a regularization parameter for the objective function based on a range of candidate regularization parameters.

14. A device, comprising:
  one or more memories; and
  one or more processors, communicatively associated with the one or more memories, to:
    generate an object,
      the object representing a set of weights for a set of potential features of a data set,
      each potential feature, of the data set, being associated with a weight of the set of weights,
      each weight corresponding to a predicted relationship between a corresponding potential feature, of the data set, and a response;
    create the object using a feature selection technique comprising executing an objective function,
      the feature selection technique being associated with a loss function, wherein the loss function is selected from the group consisting of a first loss function that is at least continuously twice differentiable and a second loss function that is not at least continuously twice differentiable,
      the objective function being generated using the loss function such that the objective function is at least twice continuously differentiable,
      the objective function comprising a neighborhood component analysis objective function that includes the loss function as a first component of a term of the neighborhood component analysis objective function, wherein:
the loss function is a function of a set of responses of the data set and not of the weights of the potential features; and
the term further comprises a second component that is a function of the set of weights of the set of potential features;
store the object;
selecting, based on the set of weights for the set of potential features of the object, a subset of the set of potential features of the data set as a set of selected features of the data set;
training, using the data set and the set of selected features, a model of a system to perform a prediction; and
providing the trained model.

15. The device of claim 14, where the one or more processors are further configured to:
provide the object.

16. The device of claim 14, where the one or more processors are further configured to:
perform a machine learning technique to train the model using the object.

17. The device of claim 16, where the one or more processors are further configured to:
perform classification or regression using the model.

18. A computer-implemented method, comprising:
receiving a loss function, wherein the loss function is not at least continuously twice differentiable;
generating an objective function for determining weights for potential features corresponding to training data,
the objective function being generated using the loss function such that the objective function is at least continuously twice differentiable,
the objective function comprising a neighborhood component analysis objective function that includes the loss function as a first component of a term of the neighborhood component analysis objective function, wherein:
the loss function is a function of a set of responses of the training data and not of the weights of the potential features; and
the term further comprises a second component that is a function of the weights of the potential features;
determining the weights for the potential features using the objective function,
the determining comprising optimizing a value of the objective function for each potential feature,
the weights representing predictive powers of corresponding potential features; and
providing the weights for the potential features;
selecting, based on the weights for the potential features, a subset of the potential features of the training data as a set of selected features of the training data;
training, using the training data and the set of selected features, a model of a system to perform a prediction; and
providing the trained model.

19. The method of claim 18, further comprising:
determining a training data set,
the training data set including a matrix of data relating to the potential features
the training data set including the set of responses,
the subset of the potential features being related to the set of responses; and
where determining the weights for the potential features comprises:
determining the subset of the potential features that are related to the set of responses using neighborhood component analysis; and
selecting the subset of the potential features as the set of selected features.

20. The method of claim 18, wherein training the model further comprises:
generating, based on the weights, a classification model or a regression model.

21. The method of claim 18, further comprising:
generating the objective function based on detecting an interaction with a user interface.

22. A non-transitory computer-readable medium storing instructions, the instructions comprising:
one or more instructions that, when executed by one or more processors, cause the one or more processors to perform:
receiving a loss function, wherein the loss function is not at least continuously twice differentiable;
generating an objective function for determining weights for potential features corresponding to training data,
the objective function being generated using the loss function such that the objective function is at least continuously twice differentiable,
the objective function comprising a neighborhood component analysis objective function that includes the loss function as a first component of a term of the neighborhood component analysis objective function, wherein:
the loss function is a function of a set of responses of the training data and not of the weights of the potential features; and
the term further comprises a second component that is a function of the weights of the potential features;
determining the weights for the potential features using the objective function,
the determining comprising optimizing a value of the objective function for each potential feature,
the weights representing predictive powers of corresponding potential features; and
providing the weights for the potential features;
selecting, based on the weights for the potential features, a subset of the potential features of the training data as a set of selected features of the training data;
training, using the training data and the set of selected features, a model of a system to perform a prediction; and
providing the trained model.

* * * * *

UNITED STATES PATENT AND TRADEMARK OFFICE
CERTIFICATE OF CORRECTION

PATENT NO. : 11,410,073 B1
APPLICATION NO. : 15/610073
DATED : August 9, 2022
INVENTOR(S) : Ilya V. Narsky et al.

Page 1 of 1

It is certified that error appears in the above-identified patent and that said Letters Patent is hereby corrected as shown below:

In the Claims

Column 18, Claim 12, Line 32, "parameter, A" should read --parameter, $\lambda$--.

Signed and Sealed this
Fourth Day of October, 2022

Katherine Kelly Vidal
*Director of the United States Patent and Trademark Office*